United States Patent (10) Patent No.: US 11,780,436 B2
Yamakawa et al. (45) Date of Patent: Oct. 10, 2023

(54) ON-BOARD SENSOR SYSTEM

(71) Applicant: Toyota Jidosha Kabushiki Kaisha, Toyota (JP)

(72) Inventors: Takeshi Yamakawa, Atsugi (JP); Yasuo Uehara, Gotemba (JP); Osamu Komeda, Mishima (JP); Kazuki Hiramoto, Susono (JP); Kazuhiro Miyazato, Susono (JP); Masamu Chiba, Susono (JP); Naohide Uchida, Numazu (JP); Hideaki Sawada, Susono (JP); Masaki Ikai, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 17/222,115

(22) Filed: Apr. 5, 2021

(65) Prior Publication Data
US 2021/0316723 A1 Oct. 14, 2021

(30) Foreign Application Priority Data
Apr. 13, 2020 (JP) ................................. 2020-071587

(51) Int. Cl.
*B60W 30/095* (2012.01)
(52) U.S. Cl.
CPC ..... *B60W 30/0956* (2013.01); *B60W 2420/52* (2013.01); *B60W 2552/10* (2020.02); *B60W 2554/4029* (2020.02)
(58) Field of Classification Search
CPC ........... B60W 30/095; B60W 30/0956; B60W 2420/52; B60W 2552/10; B60W 2552/53; B60W 2554/80; B60W 2554/4029; B60W 2554/4041; B60W 2554/4044; G01S 7/40; G01S 7/411; G01S 7/415; G01S 7/4802; G01S 13/86; G01S 13/87; G01S 13/931; G01S 2013/932; G01S 2013/9322; G01S 17/86; G01S 17/931
See application file for complete search history.

(56) References Cited

U.S. PATENT DOCUMENTS 8,050,863 B2 * 11/2011 Trepagnier ........... G05D 1/0274
340/436
9,625,582 B2 * 4/2017 Gruver .................... G01S 17/93
(Continued)

FOREIGN PATENT DOCUMENTS

DE 102012200975 A1 3/2013
EP 3279691 A1 2/2018
(Continued)

OTHER PUBLICATIONS

"Tracking Radar". Last update May 8, 2020. In Japanese Wikipedia. URL: <https://ja.wikipedia.org/wiki/%E8%BF%BD%E5%B0%BE%E3%83%AC%E3%83%BC%E3%83%80%E3%83%BC>.

*Primary Examiner* — Russell Frejd
*Assistant Examiner* — Brandon Z Willis
(74) *Attorney, Agent, or Firm* — Dinsmore & Shohl LLP

(57) ABSTRACT

An on-board sensor system includes: a first sensor configured to detect a situation around a vehicle; a second sensor having a higher angular resolution than the first sensor; an acquisition unit configured to acquire a detection result of the first sensor; and a range decision unit configured to decide, based on the detection result, an observation range to be observed by the second sensor around the vehicle.

19 Claims, 9 Drawing Sheets

(56) References Cited

U.S. PATENT DOCUMENTS

| | | | |
|---|---|---|---|
| 10,228,457 | B2 | 3/2019 | Kai |
| 11,467,595 | B2 * | 10/2022 | Templeton .............. G01S 7/484 |
| 2017/0273161 | A1 * | 9/2017 | Nakamura ............ G01S 7/4817 |
| 2017/0336504 | A1 | 11/2017 | Kai |
| 2019/0277962 | A1 * | 9/2019 | Ingram ................. G01S 17/931 |
| 2020/0110173 | A1 * | 4/2020 | Cao ....................... G01S 13/867 |

FOREIGN PATENT DOCUMENTS

| | | |
|---|---|---|
| EP | 3623844 A1 | 3/2020 |
| JP | H10246778 A | 9/1998 |
| JP | 2011145812 A | 7/2011 |
| JP | 2011150633 A | 8/2011 |
| JP | 2017-207348 A | 11/2017 |
| JP | 2018021776 A | 2/2018 |
| JP | 2019-086892 A | 6/2019 |
| JP | 2020035439 A | 3/2020 |

\* cited by examiner

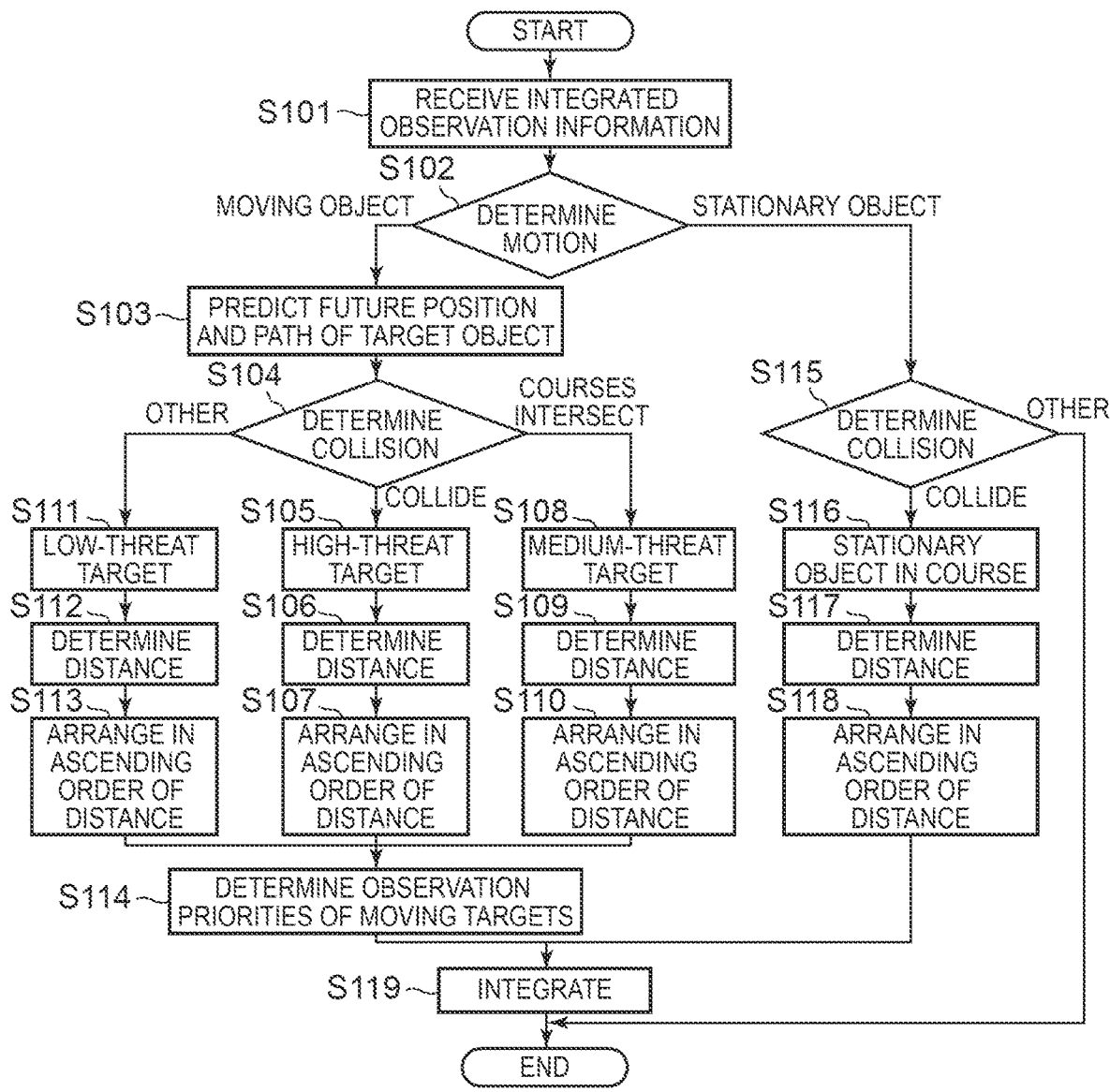

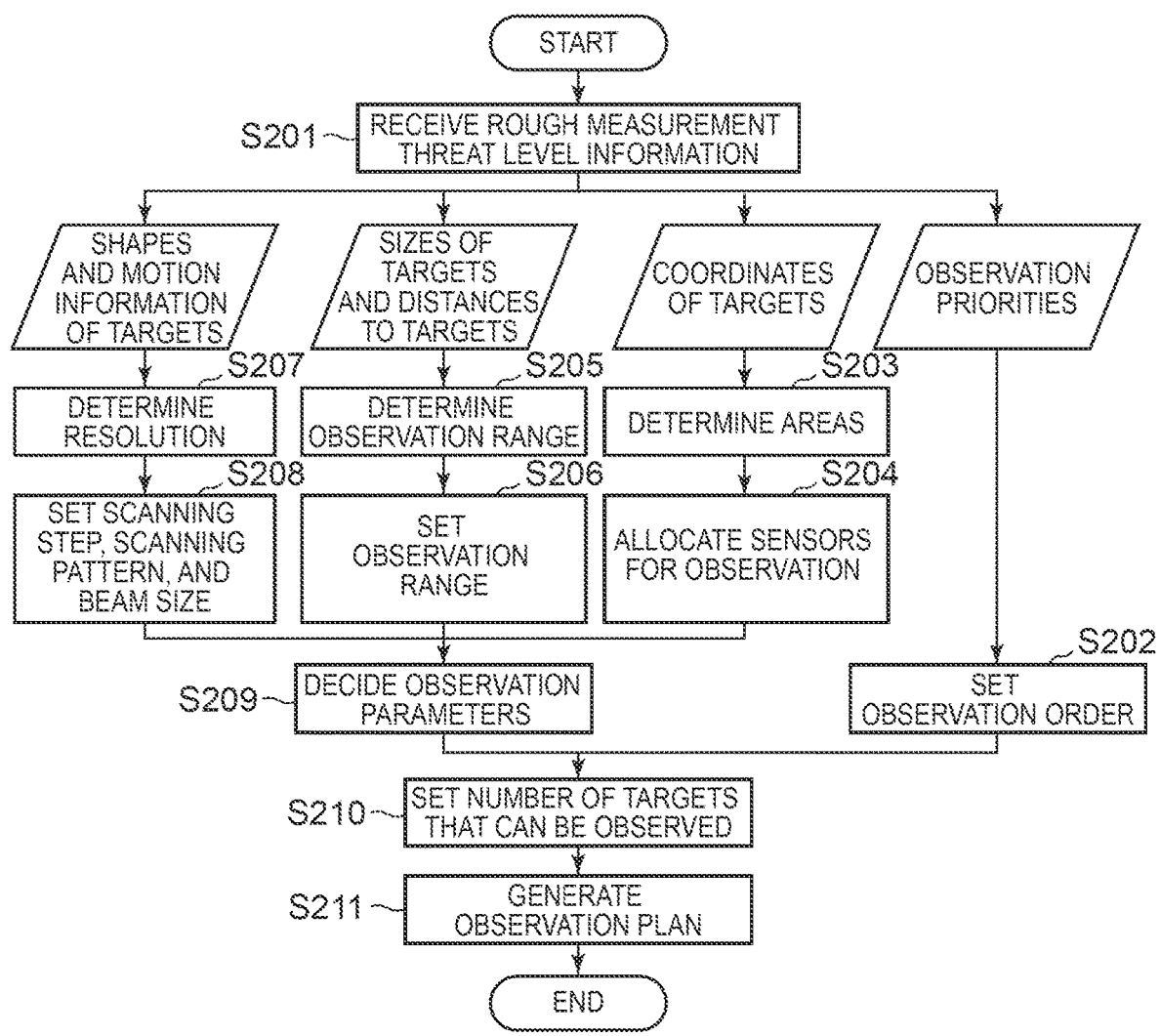
FIG. 11
FIG. 12A
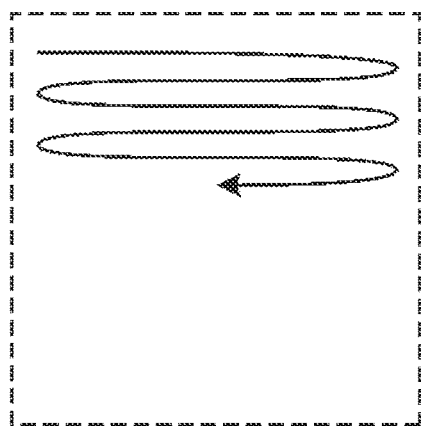
FIG. 12B
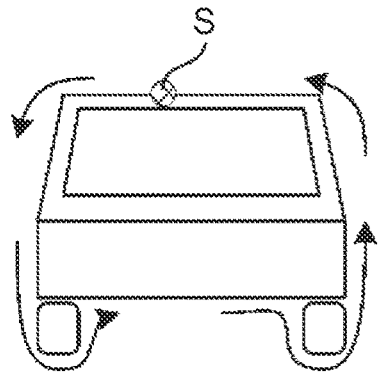

ON-BOARD SENSOR SYSTEM

CROSS-REFERENCE TO RELATED APPLICATION

This application claims priority to Japanese Patent Application No. 2020-071587 filed on Apr. 13, 2020, incorporated herein by reference in its entirety.

BACKGROUND

1. Technical Field

The disclosure relates to the technical field of on-board sensor systems.

2. Description of Related Art

For example, a system for updating a database that is used to identify and determine types of objects by a radar device based on information on the object type identification result of an on-board camera and information on the object type identification result of the radar device is proposed as an on-board sensor system (see Japanese Unexamined Patent Application Publication No. 2017-207348 (JP 2017-207348 A)). Other related techniques include Japanese Unexamined Patent Application Publication No. H10-246778 (JP H10-246778 A). JP H10-246778 A describes a technique of deciding a tracking target based on the detection result obtained with a searching beam and emitting a tracking beam toward the tracking target.

SUMMARY

For example, in order to implement more advanced autonomous driving, accurate (in other words, precise) observation results of the surroundings of a vehicle are required from sensors. The higher the required accuracy, the longer the time required for observation of the surroundings of the vehicle by the sensors tends to be. In addition, the time that can be spent for one observation is limited in vehicles that are supposed to move. For example, in the case where the radar device in the technique described in JP 2017-207348 A has higher accuracy (i.e., higher angular resolution), the radar device may not be suitable for practical use because one observation time is significantly increased.

The disclosure provides an on-board sensor system capable of acquiring accurate observation results while reducing observation time.

A first aspect of the disclosure is an on-board sensor system. The on-board sensor system is an on-board sensor system including a first sensor configured to detect a situation around a vehicle and a second sensor having a higher angular resolution than the first sensor. The on-board sensor system includes: an acquisition unit configured to acquire a detection result of the first sensor; and a range decision unit configured to decide, based on the detection result, an observation range to be observed by the second sensor around the vehicle.

According to the first aspect, the observation range of the second sensor is observed with relatively high accuracy, and the detection result of the first sensor can be used for the remaining range. According to the on-board sensor system, accurate observation results can be acquired while reducing observation time.

In the first aspect, the on-board sensor system may further include a priority level decision unit configured to decide detection priority levels of obstacles from at least one of a relative position between each of the obstacles and the vehicle, a relative motion between each of the obstacles and the vehicle, and a type of each of the obstacles based on obstacle information. The acquisition unit may be configured to acquire the obstacle information as the detection result, the obstacle information being information on the obstacles existing around the vehicle. The range decision unit may be configured to decide the observation range such that the obstacles of high detection priority levels are preferentially included in the observation range over the obstacles of low detection priority levels.

In the first aspect, the priority level decision unit may be configured to, when the obstacles include a first stationary object located above the vehicle and a second stationary object located on a road surface of a road on which the vehicle is traveling, set a higher detection priority level for the second stationary object than for the first stationary object from a relative position between the first stationary object and the vehicle and a relative position between the second stationary object and the vehicle.

In the first aspect, the priority level decision unit may be configured to set a higher detection priority level for a pedestrian when the obstacles include the pedestrian and the priority level decision unit presumes that the pedestrian is going to be in a course of the vehicle from a relative motion between the pedestrian and the vehicle, than when the priority level decision unit does not presume that the pedestrian is going to be in the course of the vehicle.

In the first aspect, the first sensor may be a radar sensor. The acquisition unit may be configured to acquire target information as the obstacle information, the target information being information on a plurality of targets each composed of a plurality of reflection points. The priority level decision unit may be configured to, when the targets include a specific target, set a higher detection priority level for the specific target than for at least a part of the targets other than the specific target, the specific target being a target corresponding to a moving object, a speed of the specific target being equal to or lower than a predetermined speed and a radar cross-section of the specific target being equal to or smaller than a predetermined radar cross-section.

In the first aspect, when the vehicle is stopped, at least a part of an observable range of the second sensor may be different from a detection range of the first sensor. The range decision unit may be configured to decide the observation range such that the obstacles of the high detection priority levels are included in the observation range when the obstacles of the high detection priority levels are out of the observable range at a first point in time, and the obstacles of the high detection priority levels enter the observable range at a second point in time later than the first point in time.

In the first aspect, the priority level decision unit may be configured to decide the detection priority levels of the obstacles by further using map information corresponding to an area including at least a part of the obstacles.

In the first aspect, the acquisition unit may be configured to acquire lane information as the detection result, the lane information being information on a lane ahead of the vehicle. The range decision unit may be configured to, when detecting from the lane information that a right turn lane ahead of the vehicle is present and that the vehicle has entered the right turn lane, decide the observation range such that the observation range includes an area and the vehicle that makes a right turn passes the area.

In the first aspect, the acquisition unit may be configured to acquire road information as the detection result, the road information being information on a road ahead of the vehicle. The range decision unit may be configured to, when detecting that the number of lanes decreases ahead of the vehicle from the road information, decide the observation range such that a merging point is included in the observation range and the merging point is a point where the number of lanes decreases ahead of the vehicle.

In the first aspect, the acquisition unit may be configured to acquire sign information as the detection result, the sign information being information on at least one of a road sign and a road marking existing around the vehicle, and the range decision unit may be configured to decide the observation range based on the sign information.

In the first aspect, the on-board sensor system may further include a control unit configured to control an emission direction of a pencil beam. The second sensor may be a sensor configured to emit the pencil beam. The acquisition unit may be configured to acquire shape information as the detection result, the shape information being information on shapes of the obstacles existing around the vehicle. The range decision unit may be configured to decide the observation range based on the shape information. The control unit may be configured to control the emission direction based on the shape information such that the pencil beam is scanned along an outer shape of the obstacles.

A second aspect of the disclosure is an on-board sensor system. The on-board sensor system includes: a first sensor configured to detect a situation around a vehicle; a second sensor having a higher angular resolution than the first sensor; and a controller. The controller is configured to acquire a detection result of the first sensor and to decide, based on the detection result, an observation range to be observed by the second sensor around the vehicle.

In the second aspect, the controller may be configured to decide detection priority levels of obstacles from at least one of a relative position between each of the obstacles and the vehicle, a relative motion between each of the obstacles and the vehicle, and a type of each of the obstacles based on obstacle information. The controller may be configured to acquire the obstacle information as the detection result, the obstacle information being information on the obstacles existing around the vehicle. The controller may be configured to decide the observation range such that the obstacles of high detection priority levels are preferentially included in the observation range over the obstacles of low detection priority levels.

In the second aspect, the controller may be configured to, when the obstacles include a first stationary object located above the vehicle and a second stationary object located on a road surface of a road on which the vehicle is traveling, set a higher detection priority level for the second stationary object than for the first stationary object from a relative position between the first stationary object and the vehicle and a relative position between the second stationary object and the vehicle.

In the second aspect, the controller may be configured to set a higher detection priority level for a pedestrian when the obstacles include the pedestrian and the controller presumes that the pedestrian is going to be in a course of the vehicle from a relative motion between the pedestrian and the vehicle, than when the controller does not presume that the pedestrian is going to be in the course of the vehicle.

In the second aspect, the first sensor may be a radar sensor. The controller may be configured to acquire target information as the obstacle information, the target information being information on a plurality of targets each composed of a plurality of reflection points. The controller may be configured to, when the targets include a specific target, set a higher detection priority level for the specific target than for at least a part of the targets other than the specific target, the specific target being a target corresponding to a moving object, a speed of the specific target being equal to or lower than a predetermined speed and a radar cross-section of the specific target being equal to or smaller than a predetermined radar cross-section.

In the second aspect, when the vehicle is stopped, at least a part of an observable range of the second sensor may be different from a detection range of the first sensor. The controller may be configured to decide the observation range such that the obstacles of the high detection priority levels are included in the observation range when the obstacles of the high detection priority levels are out of the observable range at a first point in time, and the obstacles of the high detection priority levels enter the observable range at a second point in time later than the first point in time.

In the second aspect, the controller may be configured to decide the detection priority levels of the obstacles by further using map information corresponding to an area including at least a part of the obstacles.

In the second aspect, the controller may be configured to acquire lane information as the detection result, the lane information being information on a lane ahead of the vehicle. The controller may be configured to, when detecting from the lane information that there is a right turn lane ahead of the vehicle and that the vehicle has entered the right turn lane, decide the observation range such that an area the vehicle that makes a right turn passes is included in the observation range.

In the second aspect, the controller may be configured to acquire road information as the detection result, the road information being information on a road ahead of the vehicle. The controller may be configured to, when detecting from the road information that the number of lanes decreases ahead of the vehicle, decide the observation range such that a merging point, which is a point where the number of lanes decreases ahead of the vehicle, is included in the observation range.

According to the second aspect, the observation range of the second sensor is observed with relatively high accuracy, and the detection result of the first sensor can be used for the remaining range. According to the on-board sensor system, accurate observation results can be acquired while reducing observation time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart of threat level determination according to the embodiment;

FIG. 10 shows an example of a table that defines the relationship among the threat level, the distance, and the observation priority;

FIG. 11 is a flowchart of the operation of generating an observation plan according to the embodiment;

FIG. 12A shows an example of a scanning pattern;

FIG. 12B shows an example of the scanning pattern; and

DETAILED DESCRIPTION OF EMBODIMENTS

Figure 1:
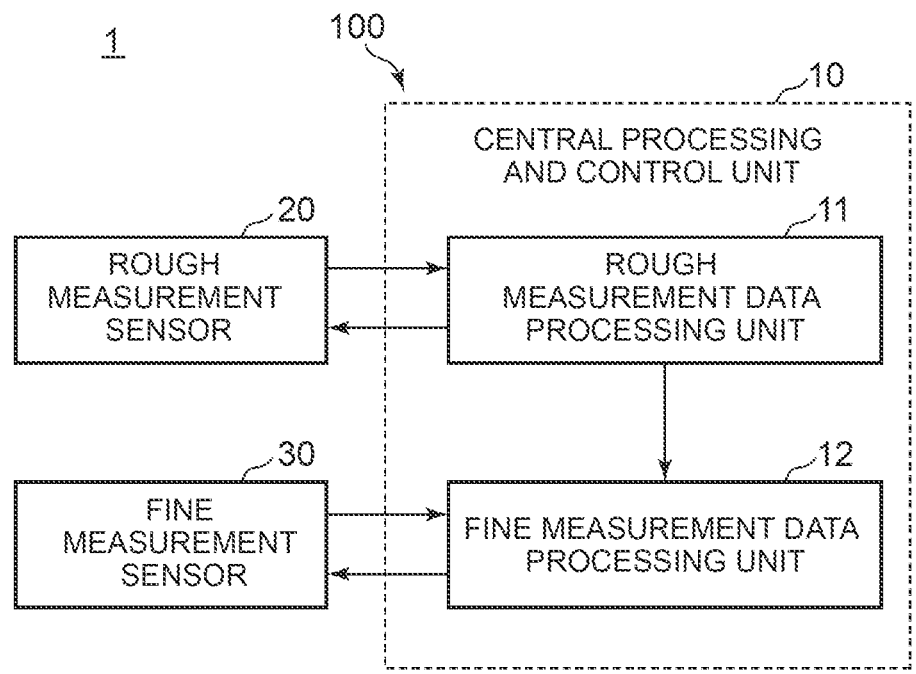
FIG. 1 is a block diagram showing an example of the configuration of a sensor system according to an embodiment.

An embodiment of an on-board sensor system will be described. The on-board sensor system according to the embodiment includes a first sensor that detects the surroundings of a vehicle and a second sensor with a higher angular resolution than the first sensor. The second sensor may be either of the same type as the first sensor or of a different type from the first sensor as long as the angular resolution of the second sensor is higher than that of the first sensor. The number of first sensors is not limited to one and may be two or more. The number of second sensors is also not limited to one and may be two or more.

The resolution of the sensor can be rated by the number of observation points per unit area (i.e., the observation density). The larger the number of observation points per unit area (in other words, the higher the observation density), the higher the resolution is rated. On the other hand, a specific resolution is represented by the minimum distance or angle that can be distinguished by the sensor. The smaller the minimum distinguishable distance or angle, the higher the resolution (i.e., the ability to distinguish between objects). That is, the smaller the minimum distinguishable distance or angle, the higher the observation density. The "angular resolution" is an index that represents the resolution by the minimum distinguishable angle. The expression "higher angular resolution than the first sensor" means "capable of distinguishing angles smaller than the minimum angle that can be distinguished by the first sensor."

For example, for a sensor (e.g., a camera etc.) that has a detection unit with a plurality of detection elements arranged two-dimensionally and that observes the range of the field of view of the detection unit at a time, the resolution corresponds to the observation density. In this case, the viewing angle (i.e., instantaneous field of view) of one detection element is a specific example of the "angular resolution."

For example, for a sensor that emits observation waves (light, radio waves, etc.) and observes reflected waves of the emitted observation waves (e.g., a Light Detection and Ranging (LiDAR), a radar, etc.), the number of emitted laser beams or beams per unit area corresponds to the observation density. For example, in the case of the LiDAR, the "angular resolution" is approximately given by "d·2 tan$^{-1}$(½x)" (this value corresponds to the scan step angle), where x represents the distance to one surface, and d represents the distance between laser spots on the one surface. For example, in the case of the radar, the beam width represented by the angle is a specific example of the "angular resolution."

The "surroundings of the vehicle" means the conditions around the vehicle at a certain point in time. The "surroundings of the vehicle" include, e.g., objects existing around the vehicle, the shape and structure of a road on which the vehicle is traveling, and information on the road surface of the road on which the vehicle is traveling. The "surroundings of the vehicle" may further include information on the weather such as rainfall and snowfall.

The "objects existing around the vehicle" may include, e.g., installed objects fixed to the ground such as guardrails, poles, and curbs; stationary objects such as parked vehicles and traffic cones; and moving objects such as traveling vehicles and pedestrians. The installed objects, the stationary objects, and the moving objects are hereinafter referred to as "obstacles," as necessary. Each of the first sensor and the second sensor may identify the objects based on, e.g., their characteristics (e.g., reflectance, color, etc.) (i.e., based on categories different from the above categories). For example, for road sings, the road sign itself and a sign stand supporting the road sign may be identified as separate objects.

The "shape and structure of the road" may include, e.g., the number of lanes, lane width, road width, curvature, a right-turn lane, a merging portion, and a diverging portion, an intersection. The "information on the road surface" may include, e.g., information on road markings on the road surface and information on unevenness of the road surface.

The on-board sensor system includes acquisition unit and range decision unit. The acquisition unit acquires the detection result of the first sensor. In the case where the first sensor is a camera, the detection result may be an image captured by the camera. In the case where the first sensor is a LiDAR or a radar, the detection result may be data including, e.g., the distance from the first sensor to a reflection point and the reflection intensity.

The range decision unit decides the observation range to be observed by the second sensor out of the area around the vehicle, based on the detection result acquired by the acquisition unit. As used herein, the "observation range" is the range that is actually observed by the second sensor and that is narrower than the observable range of the second sensor. The observable range of the second sensor is the maximum range the second sensor can observe according to its capabilities. In the case where the second sensor is, e.g., a camera including a zoom function, the "observable range" corresponds to the angle of view at the shortest focal length. In the case where the second sensor is a scanning LiDAR or radar, the "observable range" corresponds to, e.g., the viewing angle shown on a product catalog or brochure etc.

The expression "based on the detection result" is not limited to being based on the detection result itself (what is called raw data), but is a concept also including, e.g., being based on processed data of the detection result, data resulting from performing some processing (such as analytical processing) on the detection result, etc.

When information on an obstacle existing around the vehicle is obtained based on the detection result, the range decision unit may decide the observation range so that, e.g., the area around the obstacle is included in the observation range. In this case, the range decision unit may decide the observation range so that, e.g., no area other than the area around the obstacle is included in the observation range. Alternatively, when information on a plurality of obstacles existing around the vehicle is obtained based on the detection result, the range decision unit may decide the observation range so that, e.g., the obstacle corresponding to a moving object is preferentially included in the observation range. Alternatively, when it is confirmed based on the detection result that there is an intersection ahead of the vehicle, the range decision unit may decide the observation range so that the area around the intersection is included in the observation range. In this case, the range decision unit may decide the observation range so that, e.g., no area other than the area around the intersection is included in the observation range.

For example, in order to achieve more advanced autonomous driving, an accurate observation result of an on-board sensor is required regarding the surroundings of the vehicle. For example, a phased array radar that scans a pencil beam is proposed as a high accuracy sensor that outputs an accurate observation result. However, since the pencil beam has a relatively narrow beam width, the phased array radar requires several to several hundred times longer observation time than, e.g., a radar that emits a fan beam. Accordingly, even if a high accuracy sensor such as a phased array radar is mounted on a vehicle that travels on a road that is a complicated environment, there is not enough time for the sensor to observe environmental changes around the vehicle (e.g., at the time the observation result is obtained, there may be nothing indicated by the observation result at the position indicated by the observation result because the vehicle has moved or other vehicles etc. around the vehicle have moved). That is, even if a high accuracy sensor is mounted on the vehicle, it is difficult for the high accuracy sensor to deliver its full performance potential.

Accordingly, the on-board sensor system decides the observation range to be observed by the second sensor with a relatively high angular resolution (corresponding to the high accuracy sensor described above) based on the detection result of the first sensor with a relatively low angular resolution.

Since the angular resolution of the first sensor is relatively low, it takes a relatively short time to perform a process related to detection of the surroundings of the vehicle by the first sensor. In addition, since the angular resolution of the first sensor is relatively low, the amount of data of the detection result of the first sensor is relatively small. The time it takes from the detection of the surroundings of the vehicle by the first sensor to the decision of the observation range of the second sensor is thus reduced. Since the observation range of the second sensor is narrower than the observable range of the second sensor (in other words, the range to be observed by the second sensor is limited), the time it takes for the second sensor to observe the observation range is shorter than the time it takes for the second sensor to observe its entire observable range.

The observation range of the second sensor may be decided so that a point that should be noted when the vehicle travels, such as an obstacle or an intersection (in other words, a point that may relatively significantly affect traveling of the vehicle) is included in the observation range. With this configuration, a relatively accurate observation result can be obtained for the point that should be noted.

That is, the on-board sensor system performs relatively accurate observation for the observation range of the second sensor and performs relatively less accurate observation for the other ranges. The on-board sensor system can thus acquire accurate observation results while reducing the observation time. As described above, according to the on-board sensor system, a system can be implemented which acquires a relatively accurate observation result for a point that may relatively significantly affect traveling of the vehicle and acquires only a relatively less accurate observation result for a point that does not, or is unlikely to, affect traveling of the vehicle.

A sensor system 100 that is a specific example of the on-board sensor system according to the embodiment will be described with reference to FIGS. 1 to 4.

Referring to FIG. 1, the sensor system 100 is mounted on a vehicle 1 corresponding to an example of the vehicle described above. The sensor system 100 includes a central processing and control unit 10, a rough measurement sensor 20, and a fine measurement sensor 30. Although one rough measurement sensor 20 and one fine measurement sensor 30 are shown in FIG. 1, the sensor system 100 may include a plurality of rough measurement sensors 20 and a plurality of fine measurement sensors 30.

The rough measurement sensor 20 and the fine measurement sensor 30 are an example of the first sensor and the second sensor, respectively. The angular resolution of the fine measurement sensor 30 is therefore higher than that of the rough measurement sensor 20.

Figure 2:
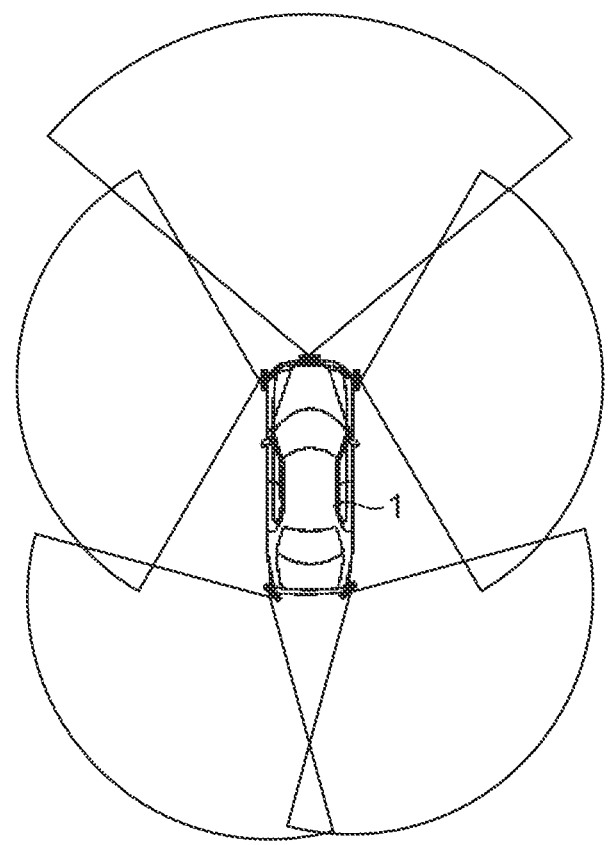
FIG. 2 shows an example of the field of views of rough measurement sensors according to the embodiment.

The positions of the rough measurement sensors 20 will be described with reference to FIG. 2. In FIG. 2, the fan-shaped ranges indicate the fields of view of the rough measurement sensors 20. For example, the rough measurement sensors 20 may be disposed on the front surface of the front of the vehicle 1 and the front right, front left, rear right, and rear left parts of the vehicle 1. The rough measurement sensors 20 may be disposed such that the field of view of one rough measurement sensor 20 overlaps at least a part of the field of view of another rough measurement sensor 20.

Figure 3:
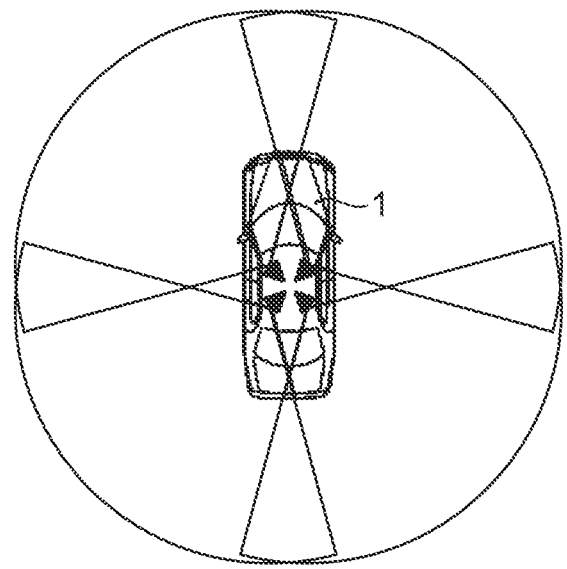
FIG. 3 shows an example of the field of views of fine measurement sensors according to the embodiment.

The positions of the fine measurement sensors 30 will be described with reference to FIG. 3. In FIG. 3, the fan-shaped ranges indicate the fields of view of the fine measurement sensors 30 (corresponding to the observable range of the second sensor described above). For example, the fine measurement sensors 30 may be disposed on the roof of the vehicle 1. The fine measurement sensors 30 may be disposed such that the field of view of one fine measurement sensor 30 overlaps at least a part of the field of view of another fine measurement sensor 30.

The number and positions of rough measurement sensors 20 and the number and positions of fine measurement sensors 30 are by way of example only, and are not limited to those described above.

The central processing and control unit 10 includes a rough measurement data processing unit 11 and a fine measurement data processing unit 12 as processing blocks logically implemented inside the central processing and control unit 10 or as processing circuits physically implemented inside the central processing and control unit 10. The rough measurement data processing unit 11 performs data processing related to the rough measurement sensor 20. The fine measurement data processing unit 12 performs data processing related to the fine measurement sensor 30.

The operations of the rough measurement data processing unit 11 and the fine measurement data processing unit 12 will be described with reference to the flowchart of FIG. 4.

Figure 4:
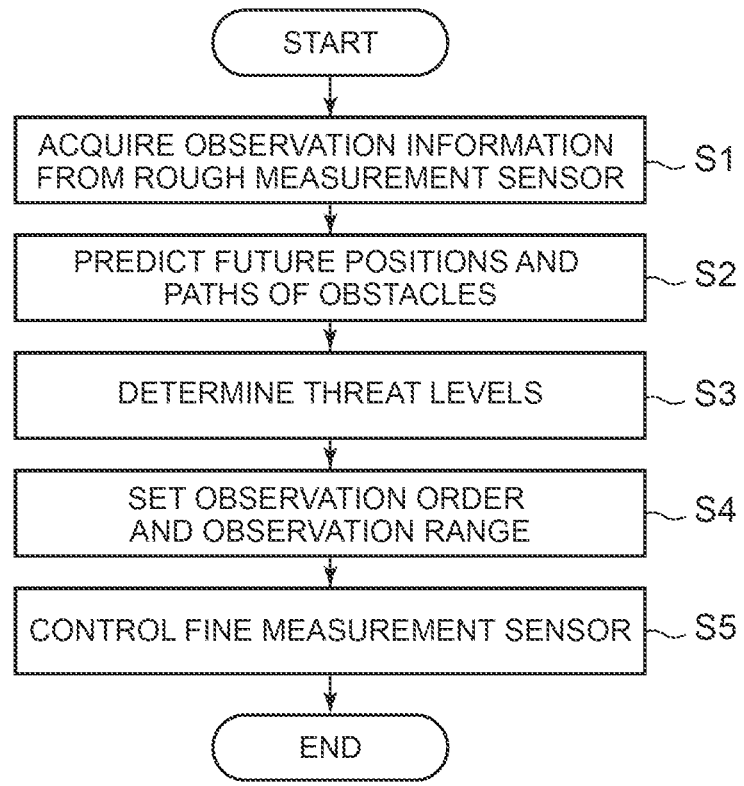
FIG. 4 is a flowchart of the operation of the sensor system according to the embodiment.

Referring to FIG. 4, the rough measurement data processing unit 11 acquires observation information (e.g., information on targets etc. corresponding to obstacles existing around the vehicle 1) from the rough measurement sensor 20 (step S1). The rough measurement data processing unit 11 predicts future positions or paths of the obstacles existing around the vehicle 1 from the observation information (step S2). The path of the obstacle may be predicted when the obstacle is a moving object. The rough measurement data processing unit 11 then determines the threat levels of the obstacles based on the processing result of step S2 and the behavior of the vehicle 1 (step S3). The threat level may be determined based on, e.g., the possibility of collision between the vehicle 1 and the obstacle. The rough measurement data processing unit 11 sends the determination result of the threat levels to the fine measurement data processing unit 12.

The fine measurement data processing unit 12 decides the obstacles to be observed by the fine measurement sensors 30 out of the obstacles existing around the vehicle 1, based on the determination result of the threat levels received from the rough measurement data processing unit 11. The fine measurement data processing unit 12 sets the observation order of the decided obstacles to be observed and sets the observation range of the fine measurement sensor 30 (step S4). The fine measurement data processing unit 12 controls the fine measurement sensor 30 to observe the obstacles to be observed by the fine measurement sensor 30 according to the set observation order and the set observation range (step S5).

A sensor system 110 that is another specific example of the on-board sensor system according to the embodiment will be described with reference to FIGS. 5 to 13. The sensor system 110 is the sensor system 100 with a more practical configuration. In the figures, the same portions as those of the sensor system 100 are denoted with the same signs, and repetitive description will be omitted as appropriate.

Figure 5:
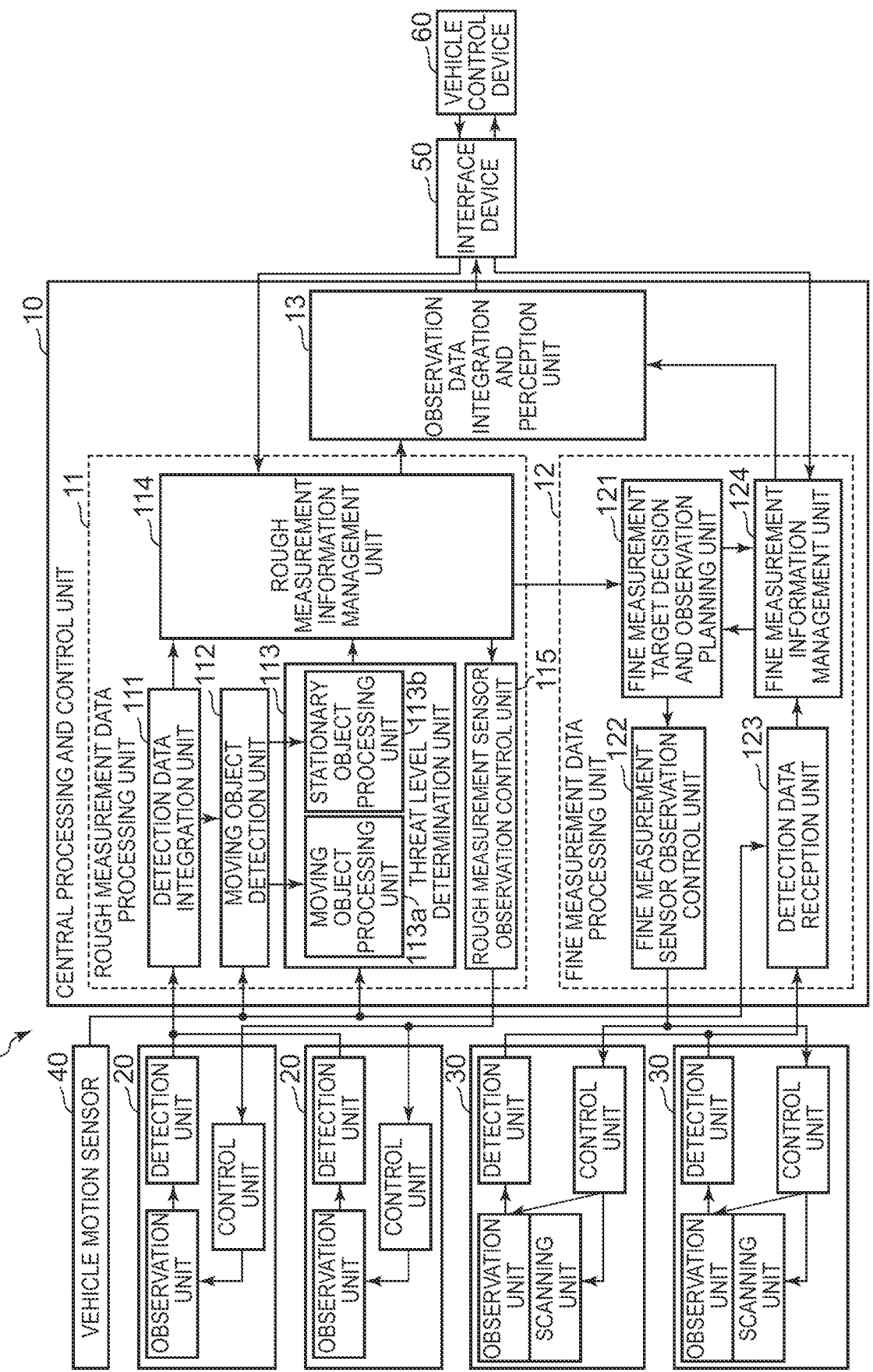
FIG. 5 is a block diagram showing another example of the configuration of the sensor system according to the embodiment.

Referring to FIG. 5, the sensor system 110 is mounted on the vehicle 1. The sensor system 110 includes the central processing and control unit 10 (hereinafter referred to as the "control unit 10," as necessary), a plurality of the rough measurement sensors 20, a plurality of the fine measurement sensors 30, and a vehicle motion sensor 40. The sensor system 110 is connected to a vehicle control device 60 of the vehicle 1 via an interface device 50.

Although two rough measurement sensors 20 are shown in FIG. 5, the number of rough measurement sensors 20 is not limited to two (that is, the number of rough measurement sensors 20 may be three or more or may be one). Similarly, the number of fine measurement sensors 30 is not limited to two.

The rough measurement sensors 20 are not limited to sensors of the same type, but may be sensors of different types. Specific examples of the rough measurement sensor 20 include a camera, a radar that emits a fan beam, and a flash LiDAR. Similarly, the fine measurement sensors 30 are not limited to sensors of the same type, but may be sensors of different types. Specific examples of the fine measurement sensor 30 include an active phased array radar, a scanning LiDAR, a frequency modulated continuous wave (FMCW) radar, an FMCW LiDAR, and a gimbal-mounted camera.

The rough measurement sensor 20 includes an observation unit, a detection unit, and a control unit. The observation unit obtains observation information. The detection unit processes raw observation data (e.g., an image, reflected wave information, etc.) output from the observation unit to identify, e.g., an object and convert the object to a point cloud or a target. The control unit receives instructions from the rough measurement data processing unit 11 that will be described later and sets observation parameters. The configuration of the rough measurement sensor 20 is by way of example only and is not limited to this.

The fine measurement sensor 30 includes an observation unit, a scanning unit, a detection unit, and a control unit. The observation unit obtains observation information. The scanning unit scans the observation unit. The detection unit identifies, e.g., an object and converts the object to a point cloud or a target. The control unit receives instructions from the fine measurement data processing unit 12 that will be described later and sets observation parameters. The configuration of the fine measurement sensor 30 is by way of example only and is not limited to this.

The vehicle motion sensor 40 includes a plurality of sensors that detects motion information of the vehicle 1. The vehicle motion sensor 40 may include, e.g., a position sensor (such as a global positioning system (GPS)), an acceleration sensor, an angular velocity sensor, etc.

The control unit 10 includes the rough measurement data processing unit 11, the fine measurement data processing unit 12, and an observation data integration and perception unit 13 as processing blocks logically implemented inside the control unit 10 or as processing circuits physically implemented inside the control unit 10.

Rough Measurement Data Processing Unit

The rough measurement data processing unit 11 includes a detection data integration unit 111, a moving object detection unit 112, a threat level determination unit 113, a rough measurement information management unit 114, and a rough measurement sensor observation control unit 115.

The detection data integration unit 111 integrates data received from each of the rough measurement sensors 20. Specifically, for the data received from each of the rough measurement sensors 20, the detection data integration unit 111, for example, performs time synchronization of the observation timings, corrects the mounting angles and mounting errors of the rough measurement sensors 20, and transforms a sensor reference frame to a coordinate system centered on the vehicle 1. At this time, the detection data integration unit 111 may correct distortions of observation points, as necessary.

The detection data integration unit 111 then integrates the data of all the rough measurement sensors 20 in a common coordinate space (that is, on the coordinate system centered on the vehicle 1). At this time, for the overlapping area of the field of view of one rough measurement sensor 20 and the field of view of another rough measurement sensor 20, the detection data integration unit 111 determines whether the data from the one rough measurement sensor 20 and the data from the another rough measurement sensor 20 match each other, and integrates the observation points for the same object (e.g., obtains the average of the values for the observation points, deletes one observation point, etc.). The common coordinate space may be a coordinate system with the origin at a point other than the center of the vehicle 1 such as an inertial coordinate system, instead of the coordinate system centered on the vehicle 1.

Figure 6:
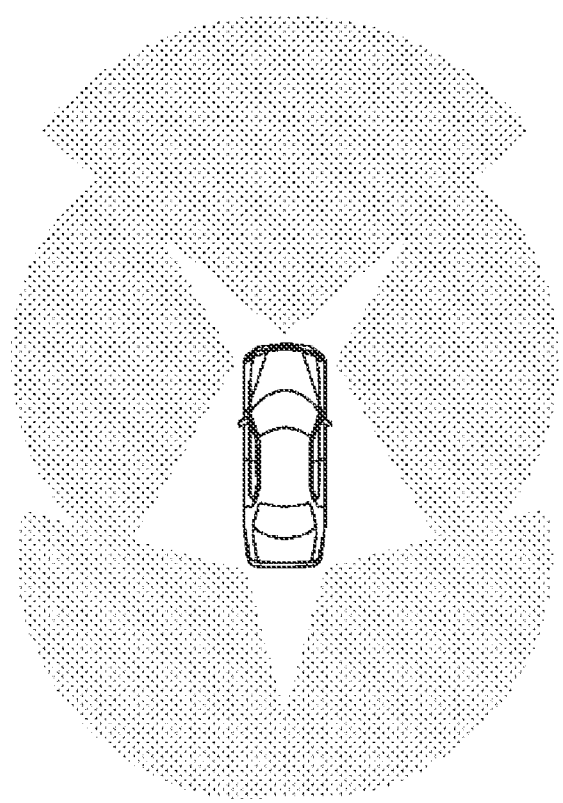
FIG. 6 shows an example of the ranges that are observed by the rough measurement sensors according to the embodiment.

The detection data integration unit 111 thus generates integrated observation data on the area around the vehicle 1 (e.g., the areas corresponding to the shaded portions in FIG. 6). The detection data integration unit 111 adds time information to the integrated observation data and sequentially sends the resultant integrated observation data to the moving object detection unit 112 and the rough measurement information management unit 114. The data integration method described above is by way of example only and is not limited to this. That is, various existing aspects can be applied to the data integration method.

The moving object detection unit 112 detects a moving object from the integrated observation data. Specifically, the moving object detection unit 112 detects the motion state of the vehicle 1 based on the output of the vehicle motion sensor 40, and then detects a moving object by removing elements resulting from the motion of the vehicle 1 from the integrated observation data and determining movement of objects. The moving object detection method may be decided as appropriate according to the type(s) of the rough measurement sensors 20. Since various existing aspects can be applied to the moving object detection method, detailed description thereof will be omitted.

The moving object detection unit 112 identifies features of the detected moving object. Examples of the features include the speed, acceleration, moving direction, relative distance to the vehicle 1, size, and information specific to the rough measurement sensors (such as radar cross-section (RCS), light reflection intensity, color, and shape). The moving object detection unit 112 also detects the object included in the integrated observation data but not detected as a moving object as a stationary object. The moving object detection unit 112 also identifies features of the detected stationary object. Examples of the features include the relative distance to the vehicle 1, size, and information specific to the rough measurement sensors. The moving object detection unit 112 sends the detection results for the moving and stationary objects to the threat level determination unit 113.

Figure 7:
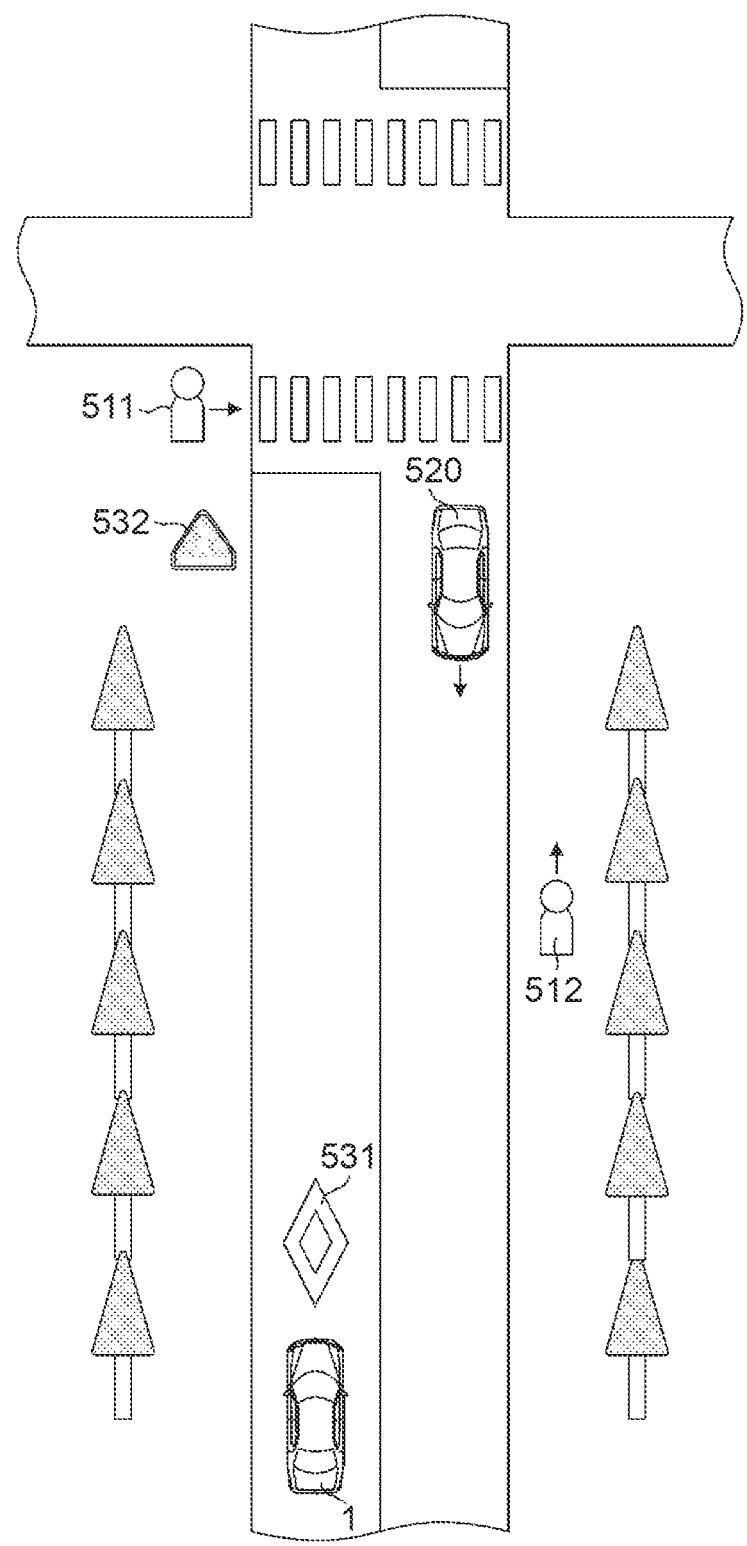
FIG. 7 shows an example of a road on which a vehicle travels.

It is herein assumed that the vehicle 1 is traveling on a road as shown in FIG. 7. Referring to FIG. 7, a pedestrian 511 is about to cross a crosswalk ahead of the vehicle 1. A pedestrian 512 is walking along the road on which the vehicle 1 is traveling. An oncoming vehicle 520 is traveling toward the vehicle 1 in the opposite lane of the road on which the vehicle 1 is traveling. There is a road sign 532 installed near the crosswalk ahead of the vehicle 1. The road sign 532 indicates the presence of a crosswalk. There are roadside trees planted on both sides of the road on which the vehicle 1 is traveling. In FIG. 7, arrows indicate the moving directions of moving objects (such as the pedestrians and the vehicle).

Figure 8:
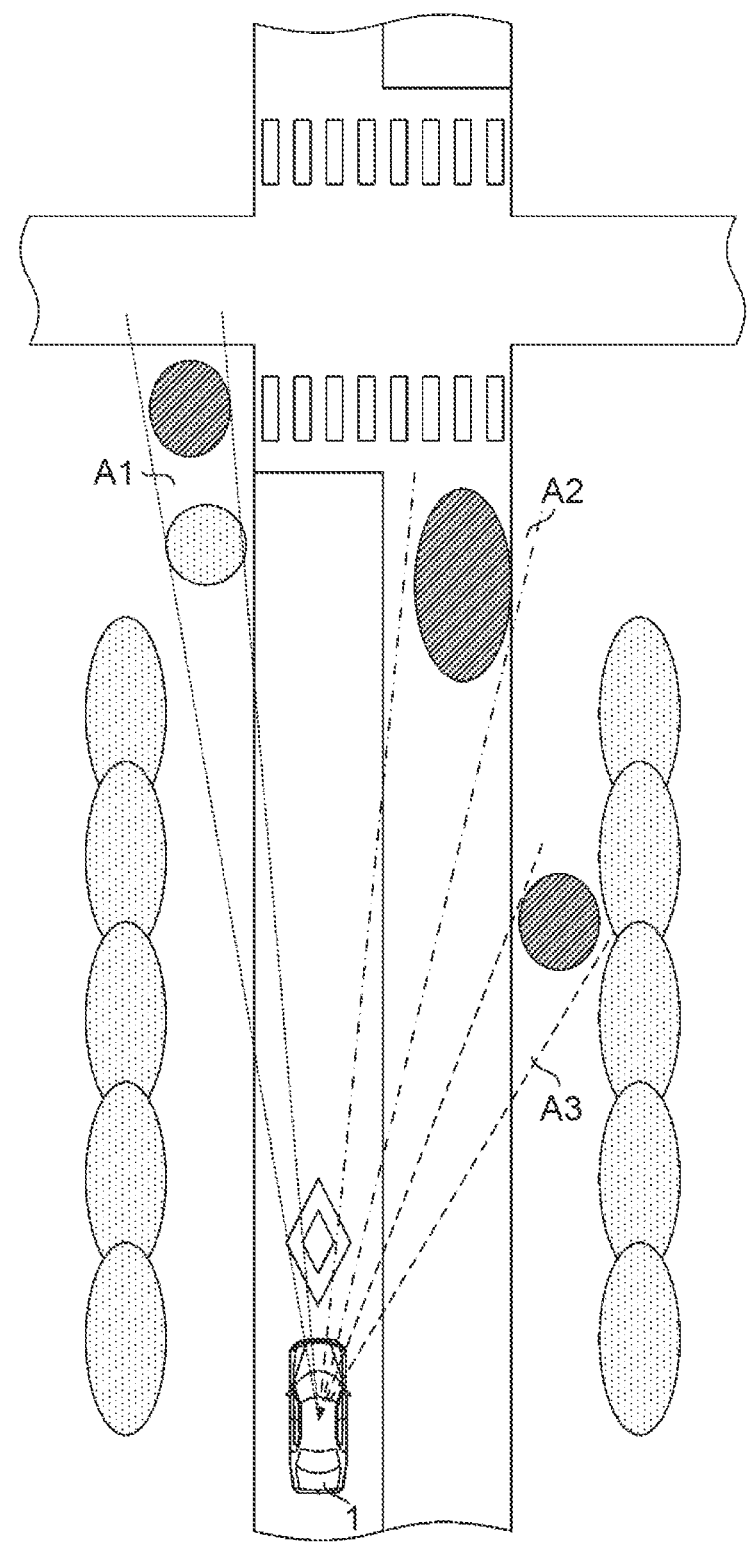
FIG. 8 is a conceptual diagram showing the concept of the observation results by the rough measurement sensors according to the embodiment.

Since the angular resolution of the rough measurement sensors 20 is relatively low, the objects such as the pedestrian 511 are observed with relatively low accuracy, as shown by, e.g., round areas in FIG. 8. Accordingly, when the objects are relatively close to each other, they may not be identified as separate objects. In FIG. 8, relatively dark shaded circular or elliptical areas indicate moving objects, and relatively light shaded circular or elliptical areas indicate stationary objects.

The threat level determination unit 113 determines the threat levels of the moving and stationary objects detected by the moving object detection unit 112. The threat level determination unit 113 includes a moving object processing unit 113*a* that determines the threat level of a moving object, and a stationary object processing unit 113*b* that determines the threat level of a stationary object.

A specific example of the threat level determination by the threat level determination unit 113 will be described with reference to FIGS. 9 and 10.

Referring to the flowchart of FIG. 9, when the moving object detection unit 112 receives the integrated observation data generated by the detection data integration unit 111 (step S101), the moving object detection unit 112 performs motion determination as described above (that is, determines movement of objects) (step S102). The moving object detection unit 112 then outputs the detection result for a moving object to the moving object processing unit 113*a*, and outputs the detection result for a stationary object to the stationary object processing unit 113*b*.

The moving object processing unit 113*a* predicts from the features of the moving object the future position and path (i.e., the path along which the moving object moves from the current position to the future position) of the moving object (hereinafter referred to as the "target object") (step S103). In parallel with or before or after step S103, the moving object processing unit 113*a* detects the motion state of the vehicle 1 (e.g., predicts the future position of the vehicle 1) based on the output of the vehicle motion sensor 40.

The moving object processing unit 113*a* performs collision determination between the target object and the vehicle 1 based on the future position and path of the target object and the future position of the vehicle 1 (and a path along which the vehicle 1 moves from the current position to the future position) (step S104). In step S104, the moving object processing unit 113*a* determines that (i) the vehicle 1 will collide with the target object, that (ii) the vehicle 1 and the target object will not collide but their courses intersect, or that (iii) the vehicle 1 will not collide with the target object and a course of the vehicle 1 will not intersect a course of the target object. That is, the moving object processing unit 113*a* performs the collision determination based on the relative position and relative motion between the vehicle 1 and the target object.

In the example of FIG. 7, the moving object processing unit 113*a* determines for the pedestrian 511 that (i) the vehicle 1 will collide with the target object or that (ii) the vehicle 1 and the target object will not collide but their courses intersect. For each of the pedestrian 512 and the oncoming vehicle 520, the moving object processing unit 113*a* determines that (iii) the vehicle 1 will not collide with the target object and the course of the vehicle 1 will not intersect the course of the target object.

When the moving object processing unit 113*a* determines that the vehicle 1 will collide with the target object (step S104: collide), the moving object processing unit 113*a* identifies the target object as a high-threat target (step S105). The moving object processing unit 113*a* also determines, e.g., the distance from the vehicle 1 to the target object identified as a high-threat target, based on the features of this target object (step S106). The moving object processing unit 113*a* then arranges a plurality of the target objects identified as high-threat targets in ascending order of distance from the vehicle 1 (step S107).

When the moving object processing unit 113*a* determines that the course of the vehicle 1 and the course of the target object intersect (step S104: courses intersect), the moving object processing unit 113*a* identifies the target object as a medium-threat target (step S108). The moving object processing unit 113*a* also determines, e.g., the distance from the vehicle 1 to the target object identified as a medium-threat target, based on the features of this target object (step S109). The moving object processing unit 113*a* then arranges a plurality of the target objects identified as medium-threat targets in ascending order of distance from the vehicle 1 (step S110).

When the moving object processing unit 113*a* determines that the vehicle 1 will not collide with the target object and the course of the vehicle 1 will not intersect the course of the target object (step S104: other), the moving object processing unit 113*a* identifies the target object as a low-threat target (step S111). The moving object processing unit 113*a* also determines, e.g., the distance from the vehicle 1 to the target object identified as a low-threat target, based on the features of this target object (step S112). The moving object processing unit 113*a* then arranges a plurality of the target objects identified as low-threat targets in ascending order of distance from the vehicle 1 (step S113).

The moving object processing unit 113*a* determines (decides) the observation priority of each target object (corresponding to the numerical values in the table shown in FIG. 10) based on the results of steps S107, S110, and S113 and, e.g., the table of FIG. 10 that defines the observation priorities (step S114). In step S114, the moving object processing unit 113a rearranges the target objects in descending order of observation priority. The numerical values in the table of FIG. 10 are by way of example only and are not limited to these.

In the example of FIG. 7, the pedestrian 511 is determined to be a high-threat target or a medium-threat target. Since the pedestrian 511 is relatively far from the vehicle 1, the observation priority of the pedestrian 511 is "6 (high-threat target)" or "9 (medium-threat target)." The pedestrian 512 and the oncoming vehicle 520 are determined to be low-threat targets. Since the pedestrian 512 is closer to the vehicle 1 than the oncoming vehicle 520 is, the observation priority of the pedestrian 512 is, e.g., "11" and the observation priority of the oncoming vehicle 520 is, e.g., "12." In this case, the moving object processing unit 113a arranges the pedestrian 511, the pedestrian 512, and the oncoming vehicle 520 in this order based on their observation priorities.

The stationary object processing unit 113b specifies, e.g., the stationary object's position, distance from the vehicle 1, size, etc. from the features of the stationary object. The stationary object processing unit 113b also detects the motion state of the vehicle 1 based on the output of the vehicle motion sensor 40 (e.g., predicts the future position of the vehicle 1). The stationary object processing unit 113b then performs collision determination between the stationary object and the vehicle 1 based on the position etc. of the stationary object and the future position of the vehicle 1 (step S115). In step S115, the stationary object processing unit 113b determines that (i) the vehicle 1 will collide with the stationary object or that (ii) the vehicle 1 and the stationary object will not collide. That is, the stationary object processing unit 113b performs the collision determination based on the relative position and relative motion between the vehicle 1 and the stationary object.

When the stationary object processing unit 113b determines that the vehicle 1 will collide with the stationary object (step S115: collide), the stationary object processing unit 113b identifies the stationary object as a stationary object in the course (step S116). The stationary object processing unit 113b also determines, e.g., the distance from the vehicle 1 to the stationary object identified as a stationary object in the course, based on the features of this stationary object (step S117). The stationary object processing unit 113b then arranges a plurality of the stationary objects identified as stationary objects in the course in ascending order of distance from the vehicle 1 (step S118).

When the stationary object processing unit 113b determines that the vehicle 1 and the stationary object will not collide (step S115: other), the stationary object processing unit 113b identifies the stationary object as no threat. The stationary object identified as no threat is excluded from further processing.

The threat level determination unit 113 integrates the result of the moving object processing unit 113a (that is, the result of step S114) with the result of the stationary object processing unit 113b (that is, the result of step S118) (step S119).

Specifically, the threat level determination unit 113 first determines the observation priority of each stationary object identified as a stationary object in the course, based on the result of the stationary object processing unit 113b and, e.g., the table shown in FIG. 10. At this time, the threat level determination unit 113 determines the observation priority of each stationary object identified as a stationary object in the course by referring to the numerical values in the row for the "stationary object in course" in the table shown in FIG. 10.

The threat level determination unit 113 then rearranges the moving and stationary objects in descending order of observation priority based on the result of the moving object processing unit 113a and the observation priorities of the stationary objects identified as stationary objects in the course.

The threat level determination unit 113 sends the result of step S119 to the rough measurement information management unit 114 as rough measurement threat level information. Time information has been added to the rough measurement threat level information. The rough measurement threat level information may include, e.g., the position, distance, size, shape, moving direction, etc. of each object (i.e., moving or stationary object) in addition to the observation priority thereof.

In the embodiment, as described above, the threat level of each object is determined based on the relationship between the motion state (e.g., the future position) of the vehicle 1 and the path and future position of the moving object and the relationship between the motion state of the vehicle 1 and the future position of the stationary object. The observation priority of each object is decided according to the threat level of the object, the distance from the vehicle 1 to the object, and the type of the object (in this example, whether the object is a moving object or a stationary object). That is, in the sensor system 110, the observation priority of each object is decided from the relative position and relative motion between the vehicle 1 and the object and the type of the object. The observation priority of each object may be decided from at least one of the relative position between the vehicle 1 and the object, the relative motion between the vehicle 1 and the object, and the type of the object.

The rough measurement information management unit 114 receives the integrated observation data from the detection data integration unit 111 and receives the rough measurement threat level information from the threat level determination unit 113. The rough measurement information management unit 114 correlates the integrated observation data and the rough measurement threat level information with each other based on the time information added to each of the integrated observation data and the rough measurement threat level information. As a result, the observation data and the rough measurement threat level information are accumulated.

The rough measurement information management unit 114 sends the rough measurement threat level information to a fine measurement target decision and observation planning unit 121 of the fine measurement data processing unit 12. At this time, the rough measurement information management unit 114 may either limit the information to be sent from the rough measurement information management unit 114 to the fine measurement target decision and observation planning unit 121 or process this information, in response to a request of the vehicle control device 60 received via the interface device 50. The rough measurement information management unit 114 sends the integrated observation data to the observation data integration and perception unit 13.

The rough measurement information management unit 114 may adjust processing parameters for the rough measurement sensors 20 in response to a request of the vehicle control device 60 received via the interface device 50. The rough measurement information management unit 114 may send the adjusted processing parameters to the rough measurement sensor observation control unit 115.

The rough measurement sensor observation control unit 115 controls each rough measurement sensor 20 according to instructions from the rough measurement information management unit 114. At this time, the rough measurement sensor observation control unit 115 may control each rough measurement sensor 20 based on the adjusted processing parameters.

Fine Measurement Data Processing Unit

The fine measurement data processing unit 12 includes the fine measurement target decision and observation planning unit 121 (hereinafter referred to as the "observation planning unit 121," as necessary), a fine measurement sensor observation control unit 122, a detection data reception unit 123, and a fine measurement information management unit 124.

The observation planning unit 121 decides observation targets of each fine measurement sensor 30 and sets the observation order and observation ranges of the observation targets, based on the rough measurement threat level information received from the rough measurement information management unit 114.

Specifically, the observation planning unit 121 generates an observation plan so that the objects are observed in descending order of observation priority indicated by the rough measurement threat level information (i.e., in descending order of threat to the vehicle 1), in view of sensor specifications information of each fine measurement sensor 30 (e.g., the observation method, observation capabilities such as angular resolution, observable range (field of view), scanning method, scanning rate, etc.). In the case where it is impossible to complete observation of all the objects within a preset observation interval (e.g., one frame period), the observation planning unit 121 may exclude the object(s) of low observation priority indicated by the rough measurement threat level information from the observation targets.

The operation of the observation planning unit 121 will be further described with reference to the flowchart of FIG. 11. Referring to FIG. 11, the observation planning unit 121 first receives the rough measurement threat level information (step S201). The observation planning unit 121 sets the observation order of the observation targets based on the observation priorities included in the rough measurement threat level information (step S202).

In parallel with step S202, the observation planning unit 121 determines the observation area (i.e., the range to be observed by the fine measurement sensor 30) for each observation target (i.e., moving or stationary object), based on the coordinates of the observation targets (i.e., the positions of the observation targets) included in the rough measurement threat level information (step S203). The observation planning unit 121 then allocates the fine measurement sensors 30 based on the observation areas (step S204). The observation area is an example of the observation range described above.

For example, the observation planning unit 121 determines that an observation area A1 shown in FIG. 8 is the observation area for the pedestrian 511 shown in FIG. 7. Similarly, for example, the observation planning unit 121 determines that observation areas A2 and A3 shown in FIG. 8 are the observation areas for the oncoming vehicle 520 and the pedestrian 512 shown in FIG. 7, respectively. For example, the observation planning unit 121 then allocates the fine measurement sensor 30 capable of observing an area in front of and to the left of the vehicle 1 to the observation area A1. The observation planning unit 121 also allocates the fine measurement sensor 30 capable of observing an area in front of and to the right of the vehicle 1 to the observation areas A2 and A3.

In parallel with steps S202 to S204, the observation planning unit 121 determines the observation range for observing the observation targets, based on the sizes of the observation targets and the distances to the observation targets included in the rough measurement threat level information (step S205). The observation planning unit 121 sets the observation range of each fine measurement sensor 30 based on the result of step S205 (step S206).

In parallel with steps S202 to S206, the observation planning unit 121 determines the resolution of the fine measurement sensors 30 (step S207). In step S207, the observation planning unit 121 may acquire the angular resolution of each fine measurement sensor 30.

For example, when the angular resolution of the fine measurement sensors 30 is 0.2 degrees, the resolution at a distance of 30 m ahead of the vehicle 1 is about 10 cm, whereas the resolution at a distance of 10 m ahead of the vehicle 1 is about 3.5 cm. When the observation target is 10 m ahead of the vehicle 1, the observation accuracy of the observation result of the observation target with the distance resolution of about 3.5 cm may be higher than the observation accuracy required for vehicle control. In this case, the resolution may be intentionally reduced to reduce the time required for the observation. That is, in step S207, the observation planning unit 121 may determine, e.g., the resolution of the fine measurement sensors 30 required for vehicle control.

Subsequently, the observation planning unit 121 sets a scanning step, scanning pattern, and beam size for each fine measurement sensor 30 based on the resolution determined in step S207 and the shape and motion information (e.g., moving direction etc.) of each observation target included in the rough measurement threat level information (step S208).

Examples of the scanning pattern include a scanning pattern like a raster scan shown in FIG. 12A and a scanning pattern shown in FIG. 12B in which beam spot s moves along the outer shape of the observation target. In some embodiments, the beam size (e.g., the size of a beam spot at the position of the observation target) be, e.g., $1/10$ to $1/100$ of the size of the observation target.

Referring back to FIG. 11, the observation planning unit 121 decides observation parameters of each fine measurement sensor 30 based on the results of steps S204, S206, and S208 (step S209). The observation planning unit 121 then sets the number of targets that can be observed within a preset allowed observation time based on the results of steps S202 and S209 and the allowed observation time (step S210). The allowed observation time may be the time corresponding to one data update cycle. For example, in the case where data is updated 50 times per second, the data update cycle is 20 milliseconds.

Subsequently, the observation planning unit 121 decides the observation targets to be actually observed by the fine measurement sensors 30 based on the result of step S210 and generates an observation plan (step S211). As described above, according to the sensor system 110, the observation target (object) of high observation priority is observed preferentially over the observation target of low observation priority. In other words, according to the sensor system 110, the observation area of each fine measurement sensor 30 is decided so that the observation target of high observation priority is preferentially included in the observation area over the observation target of low observation priority.

For example, in FIG. 8, the observation area A1 includes the circular area corresponding to the road sign 532 (see FIG. 7) in addition to the circular area corresponding to the pedestrian 511 (see FIG. 7). In this case, observing the pedestrian 511 and the road sign 532 simultaneously sometimes improves the observation efficiency.

Figure 13:
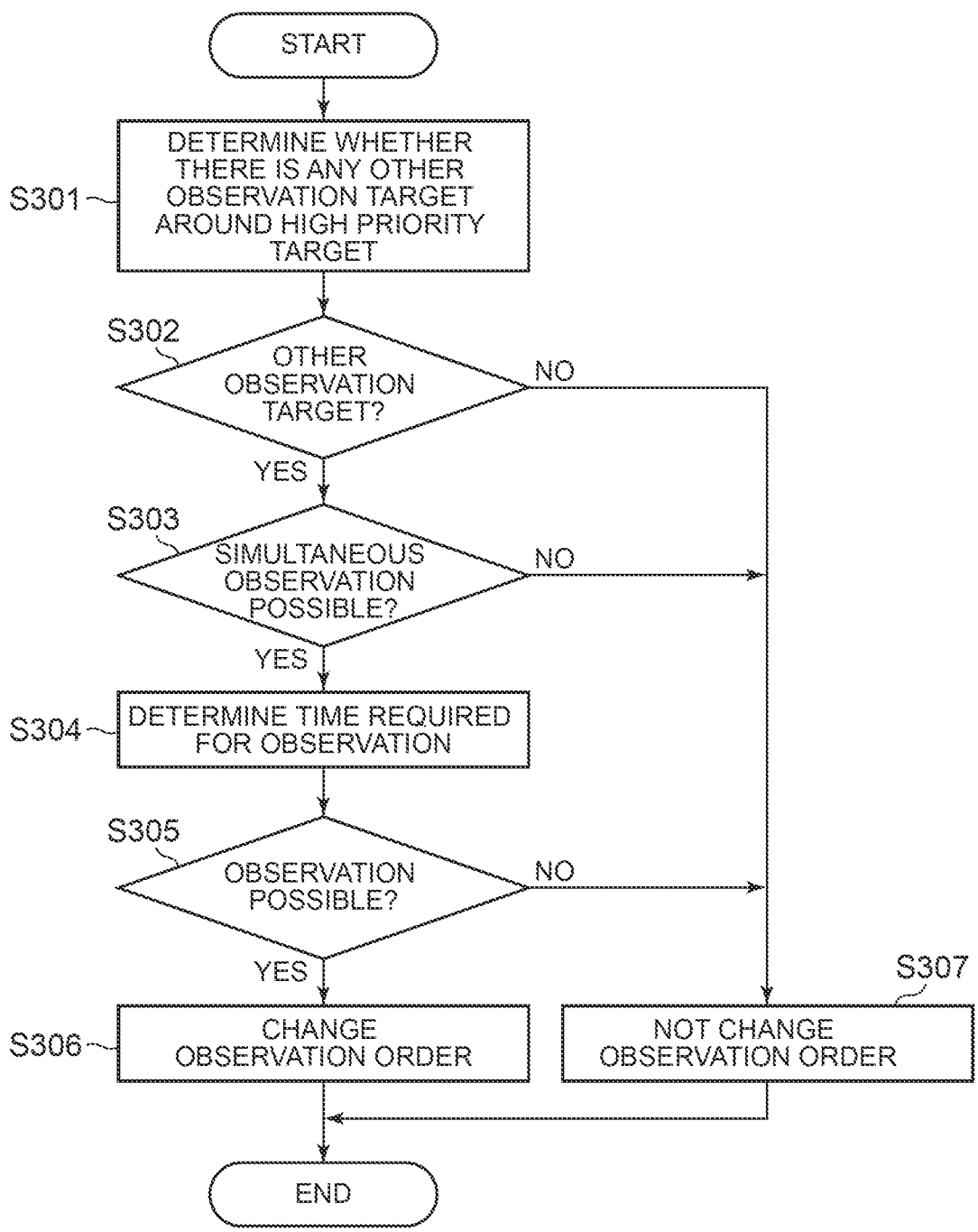
FIG. 13 is a flowchart of the operation of changing the observation order according to the embodiment.

Accordingly, for example, the observation planning unit 121 may perform the operation shown in FIG. 13 between steps S210 and S211. Specifically, the observation planning unit 121 determines the presence or absence of any other observation target around the high priority target of high observation priority (step S301). At this time, the range as defined by "around" may be decided as appropriate according to, e.g., the specifications of the fine measurement sensors 30 etc.

The observation planning unit 121 determines whether there is any other observation target based on the result of step S301 (step S302). When the observation planning unit 121 determines that there is other observation target in the process of step S302 (step S302: Yes), the observation planning unit 121 determines whether it is possible to observe the high priority target used as a reference target in step S301 and the other observation target simultaneously (step S303).

When the observation planning unit 121 determines in step S303 that it is possible to observe the high priority target and the other observation target simultaneously (step S303: Yes), the observation planning unit 121 determines the time required for the simultaneous observation (step S304). The observation planning unit 121 then determines again whether it is possible to observe the high priority target and the other observation target simultaneously, based on the result of step S304 (i.e., the time required for the simultaneous observation) (step S305).

When the observation planning unit 121 determines in step S305 that it is possible to observe the high priority target and the other observation target simultaneously (step S305: Yes), the observation planning unit 121 changes the observation order so that the other observation target is observed simultaneously with the high priority target (step S306).

When the observation planning unit 121 determines in step S302 that there is no other observation target (step S302: No), when the observation planning unit 121 determines in step S303 that it is not possible to observe the high priority target and the other observation target simultaneously (step S303: No), or when the observation planning unit 121 determines in step S305 that it is not possible to observe the high priority target and the other observation target simultaneously (step S305: No), the observation planning unit 121 ends the operation shown in FIG. 13 without changing the observation order (step S307).

The observation planning unit 121 sends the observation plan generated as described above to the fine measurement sensor observation control unit 122 and the fine measurement information management unit 124.

The fine measurement sensor observation control unit 122 sends observation instructions to the control unit of each fine measurement sensor 30 according to the observation plan received from the observation planning unit 121. The control unit of each fine measurement sensor 30 sends, e.g., information for setting the observation range, scanning pattern, scanning step, beam size, etc. to the scanning unit and the observation unit of the fine measurement sensor 30 according to the observation instructions received from the fine measurement sensor observation control unit 122. The operation of the control unit of each fine measurement sensor 30 may vary depending on the type and specifications of each fine measurement sensor 30.

The detection data reception unit 123 receives observation data from each of the fine measurement sensors 30. The detection data reception unit 123 detects the motion state of the vehicle 1 based on the output of the vehicle motion sensor 40. The detection data reception unit 123 then removes elements resulting from the motion of the vehicle 1 from the observation data. The detection data reception unit 123 thus generates fine measurement information that is the observation data including only elements resulting from the movement of the observation targets. The detection data reception unit 123 sends the fine measurement information to the fine measurement information management unit 124.

In the case where the fine measurement sensors 30 are LiDARs or radars, the detection data reception unit 123 may process point cloud data, which is the observation data, according to the characteristics of the fine measurement sensors 30. Specifically, in the case where the fine measurement sensors 30 are LiDARs, the detection data reception unit 123 may perform edge detection using a second echo. In the case where the fine measurement sensors 30 are radars, the detection data reception unit 123 may separate the observation targets by a Doppler shift.

The fine measurement information management unit 124 associates the observation plan received from the observation planning unit 121 with the fine measurement information received from the detection data reception unit 123 (i.e., the observation result of each fine measurement sensor 30 according to the observation plan). The fine measurement information management unit 124 sends the observation plan and the fine measurement information associated with each other to the observation data integration and perception unit 13.

Observation Data Integration and Perception Unit

The observation data integration and perception unit 13 integrates the integrated observation data received from the rough measurement information management unit 114 and the observation plan and the fine measurement information received from the fine measurement information management unit 124, and generates a perception map around the vehicle 1. The observation data integration and perception unit 13 refers to the perception map and sends, e.g., the observation results for the high-threat targets to the vehicle control device 60 via the interface device 50. The observation data integration and perception unit 13 may send the observation results of the rough measurement sensors 20 (e.g., the integrated observation data), a map of the observation results of the rough measurement sensors 20 with the observation results of the fine measurement sensors 30 embedded therein (e.g., the perception map), etc. to the vehicle control device 60 in response to a request from the vehicle control device 60.

The observation data integration and perception unit 13 may have accumulated the perception maps. In this case, the observation data integration and perception unit 13 may send the past recognition map(s) or a part of information included in the past recognition map(s) to the vehicle control device 60 in response to a request from the vehicle control device 60.

Technical Effects

A plurality of objects exists around a vehicle traveling on a public road. These objects are often close to each other. In this case, two (or three or more) close objects may be observed as a single object according to the observation result of a sensor with a relatively low angular resolution.

That is, due to the relatively low angular resolution, the sensor may not be able to perceive two (or three or more) close objects as separate.

Especially, for example, in the case where a moving object such as a pedestrian and a stationary object such as a roadside tree or shrub overlap each other in the field of view of the sensor during autonomous driving of the vehicle, or in the case where two moving objects moving in different directions overlap each other in the field of view of the sensor during autonomous driving of the vehicle, it would be a problem in terms of vehicle control if the moving object is not easily perceived as separate from others.

A sensor with a relatively high angular resolution is expected to be able to perceive two (or three or more) close objects as separate. However, due to the relatively high angular resolution, the time required for observation is relatively long.

This will be described using specific numerical values. For example, the stopping distance of a vehicle traveling at 60 km/h is about 40 m. From a safety point of view, the sensor is required to be able to perceive, e.g., a pedestrian located 50 m ahead of the vehicle. The angular resolution that allows the sensor to perceive a pedestrian located 50 m ahead of the vehicle is, e.g., 0.2 degrees. In this case, the resolution at a distance of 50 m ahead of the vehicle is about 18 cm.

In the case where the time required for one observation (i.e., the time it takes for the sensor to observe its entire observable range) is, e.g., 20 milliseconds, the vehicle traveling at 60 km/h moves about 30 cm during one observation. That is, the position of the sensor, which is an observation reference point, shifts by about 30 cm during one observation. In view of the value of the resolution at a distance of 50 m ahead of the vehicle, this shift of about 30 cm is considered to have a relatively significant impact on the observation result of the sensor. It is therefore not realistic to observe the entire surroundings of a moving vehicle only with a sensor(s) with a relatively high angular resolution.

In the sensor system 110, the observation areas of the fine measurement sensors 30 are therefore first set for, e.g., approximate positions of high-threat targets (that is, the ranges to be observed by the fine measurement sensors 30 are limited) based on the observation results of the rough measurement sensors 20 (integrated observation data). The fine measurement sensors 30 then observe the set observation areas. According to the sensor system 110, only the targets that may affect traveling of the vehicle 1 such as high-threat targets are observed by the fine measurement sensors 30. Relatively accurate observation results can thus be acquired while reducing the time required for one observation. According to the sensor system 110, two close objects can thus be perceived as separate while reducing the time required for one observation.

Modifications

First Modification

When deciding the observation priorities of stationary objects, the threat level determination unit 113 distinguishes between a stationary object located above the vehicle 1 such as a road guide sign and a stationary object located on the road surface of the road on which the vehicle 1 is traveling, instead of or in addition to the operation of the flowchart of FIG. 9. The threat level determination unit 113 may set only the stationary object located on the road surface as a high-threat target (at this time, the stationary object located above the vehicle 1 may be excluded from observation targets). That is, the threat level determination unit 113 may set a higher observation priority for the stationary object located on the road surface than for the stationary object located above the vehicle 1.

Second Modification

When an object corresponding to a pedestrian is detected from the integrated observation data and it is presumed (determined) from the future position etc. of the object corresponding to a pedestrian that the object will be in the course of the vehicle 1, the moving object processing unit 113a of the threat level determination unit 113 may set the object as a high-threat target. Especially when a right or left turn of the vehicle 1 is detected from, e.g., a travel plan of the vehicle 1, the fact that the vehicle 1 is traveling in a right turn lane, etc., the moving object processing unit 113a may estimate a path of the vehicle 1 associated with the right or left turn. When it is presumed that the object corresponding to a pedestrian will be in the course of the vehicle 1 traveling along the estimated path, the moving object processing unit 113a may set the object as a high-threat target. The threat level determination unit 113 thus sets a relatively high observation priority for the object identified as a pedestrian.

With this configuration, it is possible to estimate in advance a significant change that will occur in the traveling direction of the vehicle 1 and that is difficult to detect in advance by the vehicle motion sensor 40. The fine measurement sensor 30 can therefore observe, e.g., an object corresponding to a pedestrian that is currently not in the course of the vehicle 1 but will be in the course of the vehicle 1 when the vehicle 1 makes a right or left turn.

Third Modification

When a target corresponding to a moving object having a relatively small radar cross-section (RCS) and moving at a relatively low speed is detected from the observation results included in the integrated observation data, namely the observation results of radar sensors that are the rough measurement sensors 20 (i.e., target information that is information on a plurality of targets each composed of a plurality of reflection points), the moving object processing unit 113a of the threat level determination unit 113 may identify the target as a pedestrian. Unlike vehicles, pedestrians sometime change course suddenly. The moving object processing unit 113a may therefore set the target identified as a pedestrian as a high-risk target regardless of its position etc. The threat level determination unit 113 thus sets a relatively high observation priority for the target identified as a pedestrian.

Whether the RCS is relatively small may be decided by determining whether the RCS is equal to or smaller than a first predetermined value. The range of RCS that can be taken when the moving object is a pedestrian is obtained experimentally or empirically or by simulations, and the first predetermined value is decided based on the obtained range. Whether the speed of the moving body is relatively low may be decided by determining whether the speed is equal to or lower than a second predetermined value.

The speed range that can be taken when the moving object is a pedestrian is obtained experimentally or empirically or by simulations, and the second predetermined value is decided based on the obtained speed range.

Fourth Modification

As shown in FIGS. 2 and 3, the field of view of the rough measurement sensor 20 and the field of view of the fine measurement sensor 30 are different. For example, when the vehicle 1 is traveling on a narrow road with poor visibility, there may be a high-threat target that is included in the field of view of the rough measurement sensor 20 but not included in the field of view of the fine measurement sensor 30 at a first point in time. In this case, the observation planning unit 121 of the fine measurement data processing unit 12 may decide the observation area of the fine measurement sensor 30 so that the high-threat target is included in the observation area when the high-threat target enters the field of view of the fine measurement sensor 30 at a second point in time later than the first point in time.

Fifth Modification

The threat level determination unit 113 may decide the observation priority of each moving object by using map information in addition to the processing result of the moving object processing unit 113a. For example, a moving object located near an intersection is more likely to change course suddenly than a moving object located elsewhere (e.g., because a pedestrian would cross the road and a vehicle would make a right or left turn). Accordingly, the observation priority of each moving object can be more appropriately decided by using not only the distance from the vehicle 1 to the moving body but also the map information.

Sixth Modification

In the above embodiment, objects to be observed by the fine measurement sensors 30 are decided out of a plurality of objects observed by the rough measurement sensors 20. However, the fine measurement sensors 30 may observe an area that has not been observed by the rough measurement sensors 20.

Specifically, the rough measurement data processing unit 11 acquires lane information, which is information on a lane(s) ahead of the vehicle 1, from an image of an area ahead of the vehicle 1 captured by, e.g., a camera that is the rough measurement sensor 20. The rough measurement data processing unit 11 sends the lane information to the observation planning unit 121. When the observation planning unit 121 detects from the received lane information that there is a right turn lane ahead of the vehicle 1 and detects from, e.g., the motion state etc. of the vehicle 1 based on the output of the vehicle motion sensor 40 that the vehicle 1 has entered the right turn lane, the observation planning unit 121 may decide the observation area of the fine measurement sensor 30 so that the area the vehicle 1 that makes a right turn passes is included in the observation area.

The rough measurement data processing unit 11 acquires road information, which is information on the road ahead of the vehicle 1, from the image of the area ahead of the vehicle 1 captured by, e.g., the camera that is the rough measurement sensor 20. The rough measurement data processing unit 11 sends the road information to the observation planning unit 121. When the observation planning unit 121 detects from the received road information that the number of lanes decreases ahead of the vehicle 1, the observation planning unit 121 may decide the observation area of the fine measurement sensor 30 so that a merging point, which is the point where the number of lanes decreases, is included in the observation area.

The rough measurement data processing unit 11 acquires sign information, which is information on either or both of a road sign(s) and a road marking(s) that exist around the vehicle 1, from images captured by cameras that are the rough measurement sensors 20. The rough measurement data processing unit 11 sends the sign information to the observation planning unit 121. The observation planning unit 121 may decide the observation areas of the fine measurement sensors 30 based on the sign information.

It is herein assumed that, in the example of FIG. 7, either or both of a road marking 531 and the road sign 532 have been observed by the rough measurement sensor 20. Both the road marking 531 and the road sign 532 indicate that there is a crosswalk ahead of the vehicle 1. In this case, the observation planning unit 121 may decide the observation area of the fine measurement sensor 30 so that the crosswalk is included in the observation area.

With the above configuration, relatively accurate observation information is obtained on an area where a relatively large number of moving objects are or will be in the course of the vehicle 1.

APPLICATION EXAMPLES

First Application Example

The sensor system 110 is applicable not only to a single vehicle but also to, e.g., a plurality of vehicles that travel in a platoon by communicating with each other. In this case, the rough measurement sensor(s) 20 may be mounted only on the lead vehicle of the platoon and may not be mounted on the other vehicles following the lead vehicle. That is, the other vehicles may receive from the lead vehicle the observation result of the rough measurement sensor(s) 20 mounted on the lead vehicle. The operation similar to that of the sensor system 110 described above may be implemented in this manner.

Second Application Example

The sensor system 110 is applicable not only to a vehicle but also to, e.g., an unmanned moving body such as a drone. The sensor system 110 is also applicable to a plurality of unmanned moving bodies that moves in a formation or platoon. In this case, the plurality of unmanned moving bodies may include an unmanned moving body equipped with only the rough measurement sensor(s) 20 and an unmanned moving body equipped with only the fine measurement sensor(s) 30. The plurality of unmanned moving bodies may include an unmanned moving body having only functions corresponding to the control unit 10 out of the sensor system 110. That is, one sensor system 110 may be implemented by the entire plurality of unmanned moving bodies.

Various aspects of the disclosure that are derived from the above embodiment and modifications will be described below.

An on-board sensor system according to one aspect of the disclosure is an on-board sensor system including a first sensor configured to detect surroundings of a vehicle and a second sensor having a higher angular resolution than the first sensor. The on-board sensor system includes: acquisition unit configured to acquire a detection result of the first sensor; and range decision unit configured to decide, based on the detection result, an observation range to be observed by the second sensor in the surroundings of the vehicle. In the above embodiment, the rough measurement sensor 20 is an example of the first sensor, the fine measurement sensor 30 is an example of the second sensor, the detection data integration unit 111 is an example of the acquisition unit, and the fine measurement target decision and observation planning unit 121 is an example of the range decision unit.

In the aspect of the on-board sensor system, the acquisition unit is configured to acquire obstacle information as the detection result, the obstacle information being information on a plurality of obstacles existing around the vehicle. The on-board sensor system further includes priority level decision unit configured to decide detection priority levels of the obstacles from at least one of a relative position between each of the obstacles and the vehicle, a relative motion between each of the obstacles and the vehicle, and a type of each of the obstacles based on the obstacle information. The range decision unit is configured to decide the observation range in such a manner that the obstacles of high detection priority levels are preferentially included in the observation range over the obstacles of low detection priority levels.

The "relative position" is a concept that is not limited to the relative positional relationship between the vehicle and the obstacle when the vehicle is viewed in plane from above (that is, in a two-dimensional coordinate system), but also includes the relative positional relationship between the vehicle and the obstacle in a three-dimensional coordinate system also including the height direction. The expression "decide the detection priority level from the relative position" is not limited to deciding the detection priority level from the relative position itself, but may include deciding the detection priority level from a physical quantity or parameter derived from the relative position (e.g., the distance between the vehicle and the obstacle, etc.). In the above embodiment, the threat level determination unit 113 is an example of the priority level decision unit, and the observation priority is an example of the detection priority level.

In the aspect including the priority level decision unit, the priority level decision unit may be configured to, when the obstacles include a first stationary object located above the vehicle and a second stationary object located on a road surface of a road on which the vehicle is traveling, set a higher detection priority level for the second stationary object than for the first stationary object from a relative position between the first stationary object and the vehicle and a relative position between the second stationary object and the vehicle.

In the aspect including the priority level decision unit, the priority level decision unit may be configured to, when the obstacles include a pedestrian, set a higher detection priority level for the pedestrian when it is presumed from a relative motion between the pedestrian and the vehicle that the pedestrian is going to be in a course of the vehicle than when it is not presumed that the pedestrian is going to be in the course of the vehicle.

In the aspect including the priority level decision unit, the first sensor may be a radar sensor, the acquisition unit may be configured to acquire target information as the obstacle information, the target information being information on a plurality of targets each composed of a plurality of reflection points. The priority level decision unit may be configured to, when the targets include a specific target, set a higher detection priority level for the specific target than for at least a part of the targets other than the specific target, the specific target being a target corresponding to a moving object, a speed of the specific target being equal to or lower than a predetermined speed and a radar cross-section of the specific target being equal to or smaller than a predetermined radar cross-section. In the above embodiment, the target identified as a pedestrian is an example of the specific target.

In the aspect including the priority level decision unit, when the vehicle is stopped, at least a part of an observable range of the second sensor may be different from a detection range of the first sensor. The range decision unit may be configured to, when the obstacles of the high detection priority levels are out of the observable range at a first point in time, decide the observation range in such a manner that the obstacles of the high detection priority levels are included in the observation range when the obstacles of the high detection priority levels enter the observable range at a second point in time later than the first point in time. In the above embodiment, the field of view of the rough measurement sensor 20 is an example of the detection range of the first sensor, and the field of view of the fine measurement sensor 30 is an example of the observable range of the second sensor.

In the aspect including the priority level decision unit, the priority level decision unit may be configured to decide the detection priority levels of the obstacles by further using map information corresponding to an area including at least a part of the obstacles.

In another aspect of the on-board sensor system, the acquisition unit is configured to acquire lane information as the detection result, the lane information being information on a lane ahead of the vehicle, and the range decision unit is configured to, when it is detected from the lane information that there is a right turn lane ahead of the vehicle and that the vehicle has entered the right turn lane, decide the observation range in such a manner that an area the vehicle that makes a right turn passes is included in the observation range.

In still another aspect of the on-board sensor system, the acquisition unit is configured to acquire road information as the detection result, the road information being information on a road ahead of the vehicle, and the range decision unit is configured to, when it is detected from the road information that the number of lanes decreases ahead of the vehicle, decide the observation range in such a manner that a merging point, which is a point where the number of lanes decreases ahead of the vehicle, is included in the observation range.

In yet another aspect of the on-board sensor system, the acquisition unit is configured to acquire sign information as the detection result, the sign information being information on either or both of a road sign and a road marking that exist around the vehicle, and the range decision unit is configured to decide the observation range based on the sign information.

In a further aspect of the on-board sensor system, the on-board sensor system further includes control unit configured to control an emission direction of a pencil beam, and the second sensor is a sensor configured to emit the pencil beam. The acquisition unit is configured to acquire shape information as the detection result, the shape information being information on shapes of the obstacles existing around the vehicle. The range decision unit is configured to decide the observation range based on the shape information. The control unit is configured to control the emission direction based on the shape information in such a manner that the pencil beam is scanned along an outer shape of the obstacle.

The disclosure is not limited to the above embodiment and can be modified as appropriate without departing from the subject matter or idea of the disclosure that can be read from the claims and the entire specification, and on-board sensor systems thus modified also fall within the technical scope of the disclosure.

What is claimed is:
1. An on-board sensor system comprising
a first sensor configured to detect a situation around a vehicle;
a second sensor having a higher angular resolution than the first sensor;
an acquisition unit configured to acquire a detection result of the first sensor;

a range decision unit configured to decide, based on the detection result, an observation range to be observed by the second sensor around the vehicle;

an observation planning unit;

and a priority level decision unit configured to decide detection priority levels of obstacles from at least one of a relative position between each of the obstacles and the vehicle, a relative motion between each of the obstacles and the vehicle, and a type of each of the obstacles based on obstacle information, wherein:

the acquisition unit is configured to acquire the obstacle information as the detection result, the obstacle information being information on the obstacles existing around the vehicle;

the range decision unit is configured to decide the observation range such that the obstacles of high detection priority levels are preferentially included in the observation range over the obstacles of low detection priority levels; and the observation planning unit is configured to change an observation order so that an other observation target is observed simultaneously with a high priority target of high observation priority when there is any other observation target around the high priority target and it is possible to observe the high priority target and the other observation target simultaneously based on a time required for the simultaneous observation.

2. The on-board sensor system according to claim 1, wherein the priority level decision unit is configured to, when the obstacles include a first stationary object located above the vehicle and a second stationary object located on a road surface of a road on which the vehicle is traveling, set a higher detection priority level for the second stationary object than for the first stationary object from a relative position between the first stationary object and the vehicle, and a relative position between the second stationary object and the vehicle.

3. The on-board sensor system according to claim 1, wherein the priority level decision unit is configured to set a higher detection priority level for a pedestrian when the obstacles include the pedestrian and the priority level decision unit presumes that the pedestrian is going to be in a course of the vehicle from a relative motion between the pedestrian and the vehicle, than when the priority level decision unit does not presume that the pedestrian is going to be in the course of the vehicle.

4. The on-board sensor system according to claim 1, wherein:

the first sensor is a radar sensor;

the acquisition unit is configured to acquire target information as the obstacle information, the target information being information on a plurality of targets each composed of a plurality of reflection points; and the priority level decision unit is configured to, when the targets include a specific target, set a higher detection priority level for the specific target than for at least a part of the targets other than the specific target, the specific target being a target corresponding to a moving object, a speed of the specific target being equal to or lower than a predetermined speed and a radar cross-section of the specific target being equal to or smaller than a predetermined radar cross-section.

5. The on-board sensor system according to claim 1, wherein:

when the vehicle is stopped, at least a part of an observable range of the second sensor is different from a detection range of the first sensor; and the range decision unit is configured to decide the observation range in such a manner that the obstacles of the high detection priority levels are included in the observation range when the obstacles of the high detection priority levels are out of the observable range at a first point in time, and the obstacles of the high detection priority levels enter the observable range at a second point in time later than the first point in time.

6. The on-board sensor system according to claim 1, wherein the priority level decision unit is configured to decide the detection priority levels of the obstacles by further using map information corresponding to an area including at least a part of the obstacles.

7. The on-board sensor system according to claim 1, wherein:

the acquisition unit is configured to acquire lane information as the detection result, the lane information being information on a lane ahead of the vehicle; and the range decision unit is configured to, when detecting from the lane information that a right turn lane ahead of the vehicle is present and that the vehicle has entered the right turn lane, decide the observation range such that the observation range includes an area and the vehicle that makes a right turn passes the area.

8. The on-board sensor system according to claim 1, wherein:

the acquisition unit is configured to acquire road information as the detection result, the road information being information on a road ahead of the vehicle; and the range decision unit is configured to, when detecting that the number of lanes decreases ahead of the vehicle from the road information, decide the observation range such that a merging point is included in the observation range and the merging point is a point where the number of lanes decreases ahead of the vehicle.

9. The on-board sensor system according to claim 1, wherein:

the acquisition unit is configured to acquire sign information as the detection result, the sign information being information on at least one of a road sign and a road marking existing around the vehicle; and the range decision unit is configured to decide the observation range based on the sign information.

10. The on-board sensor system according to claim 1, further comprising a control unit configured to control an emission direction of a pencil beam, wherein:

the second sensor is a sensor configured to emit the pencil beam;

the acquisition unit is configured to acquire shape information as the detection result, the shape information being information on shapes of the obstacles existing around the vehicle;

the range decision unit is configured to decide the observation range based on the shape information; and the control unit is configured to control the emission direction based on the shape information such that the pencil beam is scanned along an outer shape of the obstacles.

11. An on-board sensor system comprising:

a first sensor configured to detect a situation around a vehicle;

a second sensor having a higher angular resolution than the first sensor; and a controller configured to:

acquire a detection result of the first sensor;

decide, based on the detection result, an observation range to be observed by the second sensor around the vehicle;

decide detection priority levels of obstacles from at least one of a relative position between each of the obstacles and the vehicle, a relative motion between each of the obstacles and the vehicle, and a type of each of the obstacles based on obstacle information;

acquire the obstacle information as the detection result, the obstacle information being information on the obstacles existing around the vehicle;

decide the observation range such that the obstacles of high detection priority levels are preferentially included in the observation range over the obstacles of low detection priority levels; and change an observation order so that an other observation target is observed simultaneously with a high priority target of high observation priority when there is any other observation target around the high priority target and it is possible to observe the high priority target and the other observation target simultaneously based on a time required for the simultaneous observation.

12. The on-board sensor system according to claim 11, wherein the controller is configured to, when the obstacles include a first stationary object located above the vehicle and a second stationary object located on a road surface of a road on which the vehicle is traveling, set a higher detection priority level for the second stationary object than for the first stationary object from a relative position between the first stationary object and the vehicle and a relative position between the second stationary object and the vehicle.

13. The on-board sensor system according to claim 11, wherein the controller is configured to set a higher detection priority level for a pedestrian when the obstacles include the pedestrian and the controller presumes that the pedestrian is going to be in a course of the vehicle from a relative motion between the pedestrian and the vehicle, than when the controller does not presume that the pedestrian is going to be in the course of the vehicle.

14. The on-board sensor system according to claim 11, wherein:

the first sensor is a radar sensor; and the controller is configured to acquire target information as the obstacle information, the target information being information on a plurality of targets each composed of a plurality of reflection points, and when the targets include a specific target, set a higher detection priority level for the specific target than for at least a part of the targets other than the specific target, the specific target being a target corresponding to a moving object, a speed of the specific target being equal to or lower than a predetermined speed and a radar cross-section of the specific target being equal to or smaller than a predetermined radar cross-section.

15. The on-board sensor system according to claim 11, wherein:

when the vehicle is stopped, at least a part of an observable range of the second sensor is different from a detection range of the first sensor; and the controller is configured to decide the observation range such that the obstacles of the high detection priority levels are included in the observation range when the obstacles of the high detection priority levels are out of the observable range at a first point in time, and the obstacles of the high detection priority levels enter the observable range at a second point in time later than the first point in time.

16. The on-board sensor system according to claim 11, wherein the controller is configured to decide the detection priority levels of the obstacles by further using map information corresponding to an area including at least a part of the obstacles.

17. The on-board sensor system according to claim 11, wherein the controller is configured to:

acquire lane information as the detection result, the lane information being information on a lane ahead of the vehicle; and when detecting from the lane information that a right turn lane ahead of the vehicle is present and that the vehicle has entered the right turn lane, decide the observation range such that the observation range includes an area and the vehicle that makes a right turn passes the area.

18. The on-board sensor system according to claim 11, wherein the controller is configured to:

acquire road information as the detection result, the road information being information on a road ahead of the vehicle; and when detecting that the number of lanes decreases ahead of the vehicle from the road information, decide the observation range such that a merging point is included in the observation range and the merging point is a point where the number of lanes decreases ahead of the vehicle.

19. The on-board sensor system according to claim 1, wherein:

the acquisition unit is configured to acquire information on unevenness of the road surface; and the range decision unit is configured to decide the observation range based on the information on the unevenness of the road surface.

* * * * *